Patented Nov. 3, 1925.

1,560,488

UNITED STATES PATENT OFFICE.

ELLWOOD B. SPEAR, OF AKRON, OHIO, ASSIGNOR TO THE GOODYEAR TIRE & RUBBER COMPANY, OF AKRON, OHIO, A CORPORATION OF OHIO.

METHOD OF TREATING RUBBER.

No Drawing. Application filed January 6, 1923. Serial No. 611,175.

*To all whom it may concern:*

Be it known that I, ELLWOOD B. SPEAR, a citizen of the United States, and resident of Akron, Ohio, have invented new and useful Improvements in Methods of Treating Rubber, of which the following is a specification.

My invention pertains to the manufacture of rubber and rubber compounds, and it has for one of its objects the provision of a novel method of introducing means for accelerating the vulcanization thereof.

In the manufacture of rubber and rubber compounds conditions frequently obtain which render it desirable to so treat the compound as to accelerate the rate of vulcanization. One method of providing such treatment consists in milling an accelerator in powder form into the rubber during the milling process. Another method which has been suggested comprises saturating or partially saturating a quantity of activated carbon with the accelerating agent in either a gaseous or liquid form, and milling the carbon into the compound during the rubber milling process.

By my invention I have eliminated the necessity of activating the carbon prior to treating it with the vulcanization accelerator. Also, I have provided a novel method of introducing accelerators by introducing the component parts individually by the use of unactivated carbon.

In practicing my invention I have found that carbon in any of its forms, such, for example, as lamp black, gas black, or the like, will adsorb upon its surface a certain amount of liquid or gas. It is not necessary, as commonly supposed, that the carbon be activated in order to serve as a carrier for fluids.

Thus the unactivated carbon may be saturated or partially saturated with any suitable rubber treating fluids, such, for example, as a vulcanization agent or an accelerator for vulcanization.

Another aspect of my invention consists in introducing the accelerator by introducing the component parts thereof in the form of either gas or liquid embodied in unactivated carbon. For example, the accelerator may be introduced by milling into the rubber compound a quantity of unactivated carbon charged with either a gas or liquid, and a second quantity may be then milled in which carries a second gas or liquid, as may be desired, which is adapted to combine with the first mentioned gas or liquid to form an accelerator within the compound.

For example, I may charge one quantity of the carbon with ammonia and the second with a gas, such, for example, as hydrogen sulfide, formaldehyde, or carbon dioxide. Also, the second quantity of carbon may have combined therewith a liquid, such as, acetaldehyde, furfurol, or carbon disulfide. Also, one batch may be saturated with diethylamine, and a second batch with either carbon disulfide or carbon dioxide.

Another form which my invention may assume consists in milling into the rubber compound one of the accelerator ingredients in a powder form, such, for example, as tetramethyl thiuramdisulfide, and subsequently milling thereinto a quantity of unactivated carbon saturated with ammonia.

Certain accelerator ingredients may be employed which will not separate themselves from the carbon to form the accelerator unless raised to a relatively high temperature. This provides an accelerator which may be released at any desired time.

Although I have disclosed the basic principle of my invention and have described a number of combinations which may be employed, it will be apparent to those skilled in the art that it is not so limited, but that many minor modifications and changes may be made therein without departing from the spirit of my invention or from the scope of the appended claims.

What I claim is:

1. The process of treating rubber or similar materials which comprises introducing unactivated carbon at least partially saturated with a rubber treating gas.

2. The process of treating rubber or similar materials which comprises introducing unactivated carbon having associated therewith a rubber vulcanizing agent.

3. The process of treating rubber or similar materials which comprises introducing unactivated carbon impregnated with a rubber vulcanizing fluid.

4. A rubber derived from rubber combined with unactivated carbon at least partially saturated with a rubber vulcanizing agent.

5. A rubber product derived from rubber combined with unactivated carbon carrying a rubber treating agent.

6. A rubber product derived from rubber combined with unactivated carbon saturated with a rubber treating fluid.

7. A rubber product derived from rubber combined with unactivated carbon impregnated with a rubber treating gas.

8. The method of introducing a vulcanization accelerator to a rubber compound which comprises introducing the several ingredients thereof by means of an unactivated carrying agent.

9. The method of introducing a vulcanization accelerator to a rubber compound which comprises introducing the several ingredients thereof individually by means of an unactivated compounding agent.

10. The method of introducing a vulcanization accelerator to a rubber compound which comprises introducing the elements thereof individually by means of unactivated carbon.

11. The method of treating rubber which comprises milling thereinto an unactivated compounding ingredient carrying a fluid and an additional unactivated compounding ingredient carrying a second fluid which is adapted to combine with said first mentioned liquid to form a vulcanization accelerator.

12. The method of treating rubber which comprises introducing thereinto a quantity of unactivated carbon saturated with a fluid and a second quantity of unactivated carbon saturated with a second fluid which is adapted to combine with said first mentioned fluid to form a vulcanization accelerator.

13. The method of treating rubber which comprises milling thereinto an accelerator ingredient in a powder form, and milling thereinto a quantity of unactivated carbon saturated with a second ingredient adapted to combine with said first mentioned ingredient to form a vulcanization accelerator.

In witness whereof, I have hereunto signed my name.

ELLWOOD B. SPEAR.